UNITED STATES PATENT OFFICE.

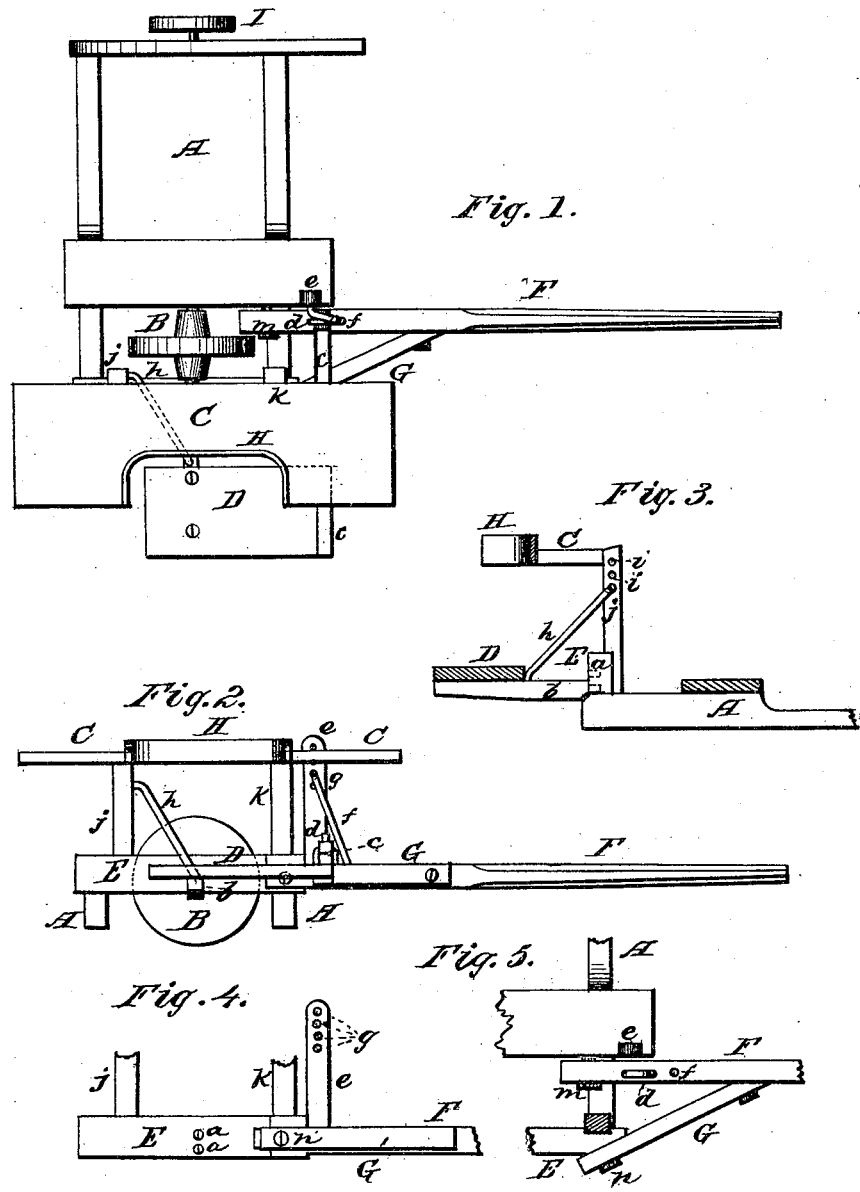

CHARLES W. MARSH AND WILLIAM W. MARSH, OF SYCAMORE, ILLINOIS.

IMPROVEMENT IN BINDERS' STANDS FOR HARVESTERS.

Specification forming part of Letters Patent No. 178,541, dated June 13, 1876; application filed December 7, 1875.

*To all whom it may concern:*

Be it known that we, CHARLES W. MARSH and WILLIAM W. MARSH, of Sycamore, De Kalb county, State of Illinois, have invented new and useful Improvements in Binders' Stands for Harvesters, of which the following is a full description, reference being had to the accompanying drawings, in which—

Figure 1 is a top or plan view; Fig. 2, a side view; Fig. 3, a central vertical section of the binding devices; Fig. 4, a side view of the lower portion of the frame-work; Fig. 5, a top view of the draft-pole attachment.

This invention relates to binders' stands; and consists in supporting the stand at its front end upon the tongue, and the rear end upon the main frame, and being vertically adjustable, as will be hereinafter more fully described.

In the drawings, A represents the carrier or platform upon which the grain falls as it is cut; B, the main or drive wheel; C, the binders' table; D, the binders' platform or stand; E, the side rail, to which the rear end of the platform D is attached; F, the draft-pole; G, the brace of the draft-pole; H, the curved or raised border on the binding-table; I, the grain-wheel; $a$, the holes for adjusting the rear end of the platform D; $b\ c$, the supporting-bars of the platform D; $d$, the loop on the draft-pole for holding the end of the bar $c$; $e$, the post; $f$, the brace or rod, and $g$ the holes for adjusting the cut of the machine; $h$, the brace for the rear end of the platform D; $i$, the holes in the post $j$ for adjusting the brace $h$; $j\ k$, the post for supporting the binders' table $c$; $m\ n$, the pivots of the tongue or draft-pole E.

The frame-work is made of the usual form, and provided with a cutting apparatus, and a carrier and elevator to deliver the grain upon the table C; but as these parts form no part of this invention, they are not shown, and need not be described, as they are made in any suitable and well-known manner. The table C is made of sufficient length to combine a central receiver with a binding-table at each end, as shown. The receiver is provided with a raised portion, H, around the opening where the binders stand. This raised portion is most conveniently made by inserting a bent piece in the opening, as shown. This arrangement gives a wide bearing for the binders to lean against in steadying themselves, and prevents injuring their clothing, and is less liable to bruise or lame the binders from the unequal movements of the machine; and it also prevents the grain from falling over before a sufficient amount has accumulated for a gavel or bundle.

The binders' platform D is supported by the bars $b\ c$. The rear bar $b$ is inserted in the side rail or cross-sill E, so that it can be taken out when desired. It is held in place by the inclined brace $h$, which is fastened at its upper end to the post $j$. The side rail E and post $j$ are provided with a series of holes, $a\ i$, so that the platform D may be raised or lowered, so as to adjust the platform in reference to the distance between it and the binding-table C, to accommodate the height of the different persons binding on the machine at different times.

The front end of the platform D is supported by the bar $c$, which extends across the tongue, as shown, and is held in place by a loop, $d$, and may be further fastened by a pin, if desired. This bar $c$ is located on the tongue in front of its pivot or pivots $m\ n$, so that as the cutting apparatus or front part of the machine is raised or lowered, the height of the bar $c$ will be but slightly varied.

$e\ f$ represent the device for raising and lowering the cutting or front part of the machine, which is a very simple device, consisting of a brace, $f$, and a post, $e$, provided with a series of holes, $g$.

Instead of this simple device, more complicated, or more easily managed ones, are usually applied, and we do not, therefore, limit ourselves to the device shown, as our improvement may be used in connection with any of the devices used for raising or lowering the cut.

By this arrangement of the platform D, and supporting its front end upon the tongue, forward of its pivotal connection to the machine, it will be seen that the raising or lowering of the front edge or cut of the machine, affects the pitch of the platform D but very little, keeping it substantially level, whether the front of the machine is high or low.

What we claim as new, and desire to secure by Letters Patent is as follows:

The binders' stand D, supported at its front end upon the tongue, and at its rear end upon the main frame, and vertically adjustable thereon, for varying the distance between the stand and table, substantially as and for the purpose set forth.

CHARLES W. MARSH.
WILLIAM W. MARSH.

Witnesses:
A. M. STARK,
C. W. MOSHER.